W. H. Nauman.
Seed Drill.

No. 89,882. Patented May 11, 1869.

Witnesses.
Denis Regan
Wm H Sigman

Inventor.
Wm H Nauman

United States Patent Office.

WILLIAM H. NAUMAN, OF DAYTON, OHIO.

Letters Patent No. 89,882, dated May 11, 1869; antedated April 13, 1869.

IMPROVEMENT IN SEED-DRILL.

The Schedule referred to in these Letters Patent and making part of the same.

To all whom it may concern:

Be it known that I, WILLIAM H. NAUMAN, in the county of Montgomery, and State of Ohio, have invented a new and useful Improvement in Seed-Drills; and I do hereby declare that the following is a full, clear, and exact description of the construction and operation of the same, reference being had to the accompanying drawings, making a part of this specification, in which—

Figure 1:
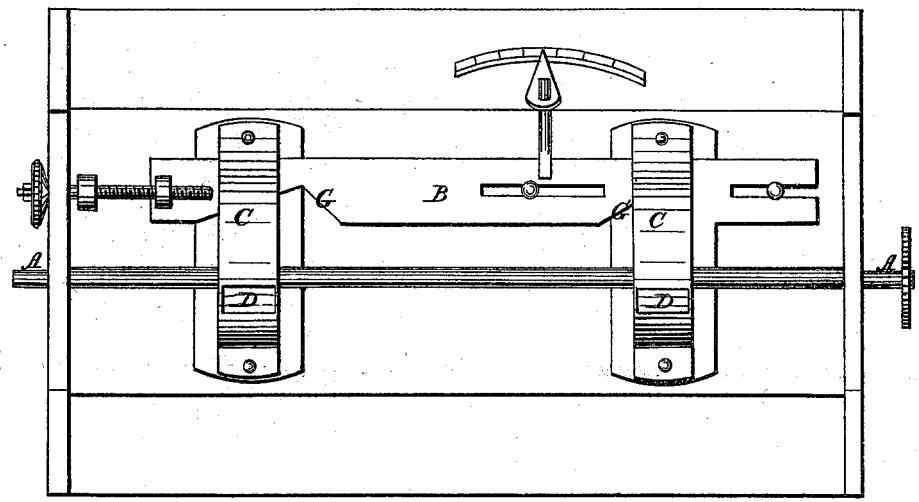

Figure 1 represents the hopper-bottom with feed wheel, cup, and slide attached.

Figure 2:
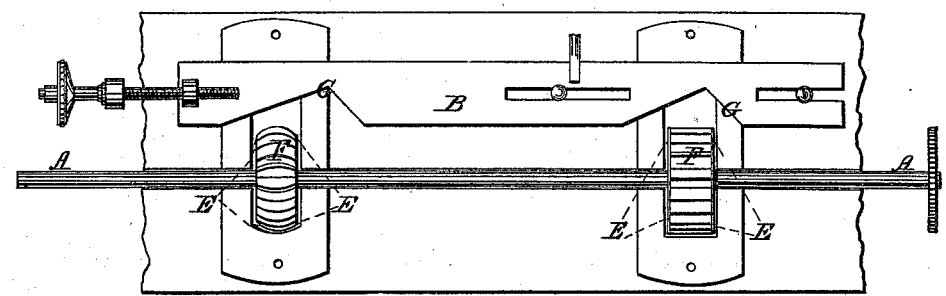

Figure 2, feed-wheel and slide.

Figure 3:
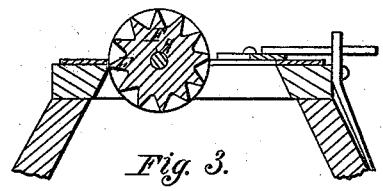

Figure 3, end view of feed-wheel with flanges off.

Figure 4:
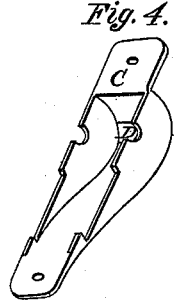

Figure 4, the cup detached.

The object of my invention is to provide a seed-drill that will sow grain more regularly than other drills, and that will not choke with straws or white-caps that may be in the seed, and that can be regulated to sow any quantity of seed to the acre that may be desired, without increasing or diminishing the motion of the feed-wheels, thereby dispensing with a great number of gear-wheels as used by other drills having cups under the hopper in which the feed-wheels run.

The feed-wheels A, which run in the cup C, under the hopper-bottom, and through into the hopper, are provided with flanges E on either side, and cogs F running across connecting with the flanges, the object of the flanges being to prevent the breaking of grain.

This arrangement carries the grain through the aperture G, made by the slide B, into the cup C, and forces it out at the discharge-opening, D.

The adjustable slide B is placed in front of the feed-wheels A, and held to its place by the cup C, and has spaces cut out G, so that in moving the slide B, the aperture G, between the cup and feed-wheel, may be increased or diminished at pleasure, thereby leaving any desired quantity of seed through the aperture into the cup, thus avoiding the necessity of increasing or diminishing the speed of the feed-wheels, as is done by other drills having cups under the hopper, in which the feed-wheel runs.

The cup C, under the hopper-bottom, covers one-half the feed-wheel, and may be made large enough to pass any quantity of seed that may be left through the aperture G made by the slide B, the object of the cup being to pass either much or little seed through the discharge-opening D.

The indicator attached to the slide, as shown in fig. 1, is for indicating the quantity of seed sown to the acre. The screw on the end of the slide is for moving the slide.

Having thus described my improvement,

What I claim as my invention, and desire to secure by Letters Patent, is—

1. A feed-wheel running in a cup under the hopper and through the hopper-bottom, when the quantity of seed is regulated by a slide, as described, as and for the purpose set forth.

2. The adjustable slide B, placed in front of the feed-wheel, in combination with the cup C, substantially as and for the purpose set forth.

3. The combination and arrangement of the feed-wheel A, slide B, and cup C, as described and shown.

WM. H. NAUMAN.

Witnesses:
  DENIS REGAN,
  WM. H. SIGMAN.